United States Patent [19] [11] Patent Number: 4,850,604
Le Marchand et al. [45] Date of Patent: Jul. 25, 1989

[54] SHOPPING TROLLEY PROVIDED WITH A PIVOTING BASKET

[75] Inventors: Alain Le Marchand, Reichstett; Daniel Bailly, Bischheim, both of France

[73] Assignee: Ateliers Reunis Caddie, Schiltigheim, France

[21] Appl. No.: 217,221

[22] Filed: Jul. 11, 1988

[30] Foreign Application Priority Data

Apr. 6, 1988 [FR] France ............................ 88 04505

[51] Int. Cl.$^4$ ............................................. B62B 3/00
[52] U.S. Cl. .............................. 280/33.996; 211/149; 280/79.3
[58] Field of Search ................. 280/33.99 H, 33.99 R, 280/33.99 S, 79.3, 654; 211/151, 150, 149, 99, 100; 108/40

[56] References Cited

U.S. PATENT DOCUMENTS

| | | | |
|---|---|---|---|
| 1,541,342 | 6/1925 | Friel | 108/40 |
| 3,026,122 | 3/1962 | Young | 280/33.99 H |
| 3,052,484 | 9/1962 | Huffman et al. | 280/47.35 |

FOREIGN PATENT DOCUMENTS

| | | | |
|---|---|---|---|
| 3301608 | 7/1984 | Fed. Rep. of Germany | 280/33.99 H |
| 8800148 | 1/1988 | World Int. Prop. O. | 280/33.99 H |

*Primary Examiner*—David M. Mitchell
*Attorney, Agent, or Firm*—Young & Thompson

[57] ABSTRACT

A shopping trolley is provided at the top with a horizontal carrier trolley pivotally mounted on its frame in such a manner as to permit withdrawal to a vertical position at the rear end of the trolley by means of two lateral guides. Trunnions which are carried by the sides of the pivoting basket and which define its horizontal axis of pivotal displacement are engaged within the guides. These guides are inclined in such a manner as to ensure that their lower ends are placed further forward than their upper ends so that in the vertical position of withdrawal, the pivoting basket is placed between the two lateral uprights of the handle-bar frame without projecting behind this frame. In addition, the trolley basket is closed at the rear end by a flap which is freely mounted for pivotal displacement at its top edge. Trolleys of this type can be interengaged in readiness for use when their carrier baskets are placed either in a horizontal position or in a withdrawn position.

3 Claims, 3 Drawing Sheets

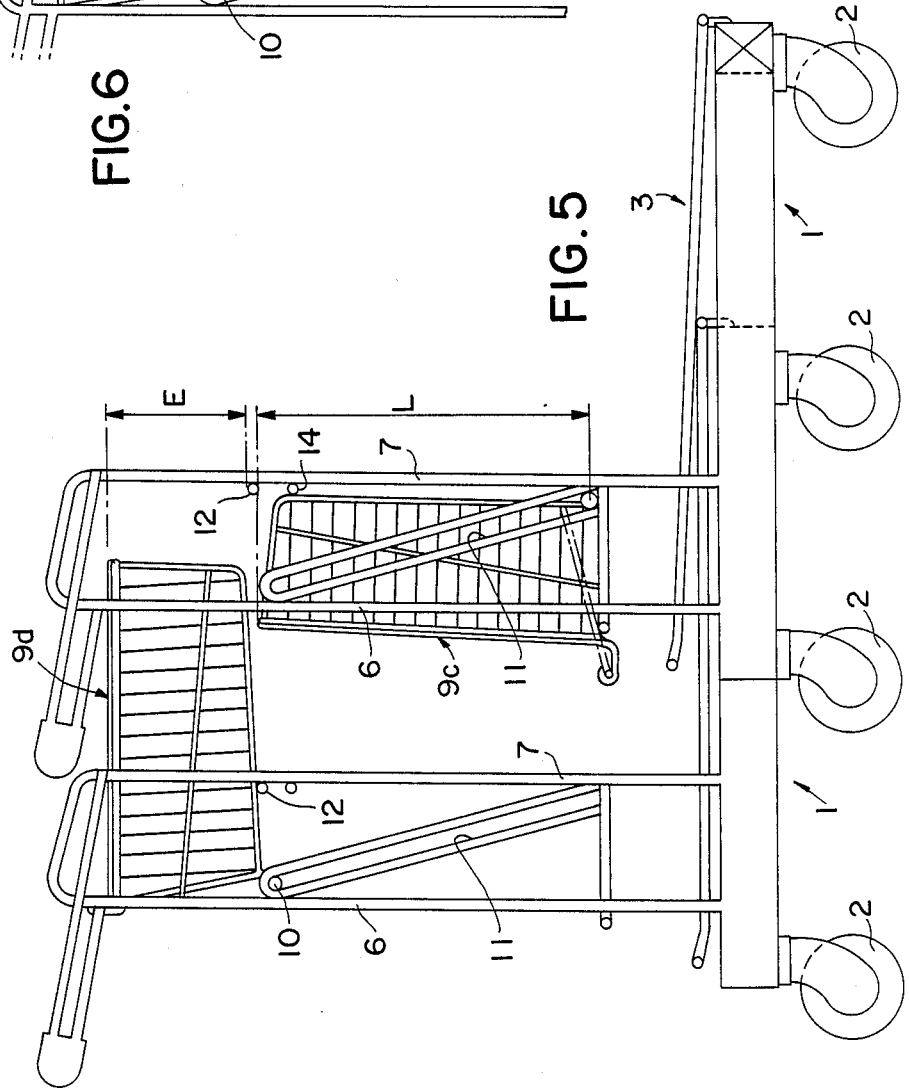

SHOPPING TROLLEY PROVIDED WITH A PIVOTING BASKET

BACKGROUND OF THE INVENTION

1. Field of the Invention

The present invention relates to shopping trolleys which are put at the disposal of customers in self-service stores.

More specifically, the invention is concerned with a trolley of the type comprising on the one hand a carrier platform located at the bottom of the trolley and a complementary carrier element located at the top and consisting of a horizontal basket or tray. The bottom platform is intended to carry bulky merchandise whereas the top basket or tray is designed to carry articles of smaller size. Trolleys of this type are primarily intended to equip stores for the sale of building and construction materials, "do-it-yourself" articles and other equipment of various types.

2. Description of the Prior Art

With a view to providing a greater degree of freedom of use of these trolleys, the upper trolley basket or tray is pivotally mounted on the frame in order to be capable of withdrawing to a vertical position and thus freeing the entire space located above the bottom platform. Guiding of this movable element into its position of withdrawal is performed by means of two vertical guides which extend against the rear uprights of the handle-bar frame and in which are engaged trunnions carried by the sides of the movable element, the horizontal axis of pivotal displacement of this element being defined by said trunnions.

Moreover, trolleys of this type are so arranged as to be capable of interengagement when they are stored for subsequent use. However, this interengagement is possible only if the upper basket or tray of all the trolleys has first been placed in its vertical position of withdrawal. However this constitutes a highly inconvenient requirement.

Furthermore, when the carrier element provided at the top of a trolley consists of a basket, the depth of interengagement of trolleys is relatively limited. This is due to the fact that, in the vertical position of withdrawal, each basket projects to the rear of the handle-bar frame of the corresponding trolley over a distance corresponding approximately to its depth. Here again, this is an objectionable drawback since the overall bulk of a waiting line of trolleys is greater than in the case of conventional shopping trolleys of the fixed-basket type.

It is for this reason that the aim of the invention is to construct shopping trolleys of the type considered which are provided with a pivoting top basket but so designed as to circumvent the drawbacks set forth in the foregoing. To this end, the design of these trolleys is such that, in their vertical position of withdrawal, the pivoting baskets do not limit the depth of engagement of trolleys. However, the trolley design is also such that these latter can be engaged within one another even when their carrier baskets are left in the horizontal position of use.

SUMMARY OF THE INVENTION

The trolley in accordance with the invention is essentially distinguished by the fact that:

in the first place, the two guides which are provided for the trunnions of the pivoting basket and which are disposed in two vertical planes parallel to the longitudinal axis are inclined in such a manner as to ensure that their lower ends are placed further forward than their upper ends so that in the vertical position of withdrawal, the pivoting basket is placed between the two uprights of the handle-bar frame without projecting behind this latter;

in the second place, said pivoting basket is closed at the rear end by a flap which is freely mounted for pivotal displacement at its top edge and the shape of which permits engagement of the basket through the similar rear end of another identical trolley.

Thus the trolleys in accordance with the invention can be interengaged both when their carrier baskets are placed in the horizontal position and when said baskets are in the withdrawn position. It will accordingly be found preferable to interengage all the trolleys whose carrier baskets are located in the same position, thus making it necessary to form two separate waiting lines of trolleys.

However, in an advantageous form of construction of the shopping trolley in accordance with the invention, the pivoting basket of this latter has a length such that, in the vertical position of withdrawal, there is left above the basket a free space of sufficient height to permit engagement of the similar basket of another identical trolley. The trolleys in this form of construction can accordingly be engaged inside one another even if the pivoting basket is in the horizontal position in some cases whereas the same basket is in the vertical position of withdrawal in other cases.

BRIEF DESCRIPTION OF THE DRAWINGS

FIG. 5 is a view in elevation of two trolleys corresponding to another embodiment and shown after interengagement, the basket of one trolley being in its horizontal position of use and the basket of the other trolley being in its vertical position of withdrawal.

FIG. 6 is a partial view in elevation showing a variant of the system for mounting the pivoting basket in the form of construction which is contemplated.

DESCRIPTION OF THE PREFERRED EMBODIMENTS

Figure 1:
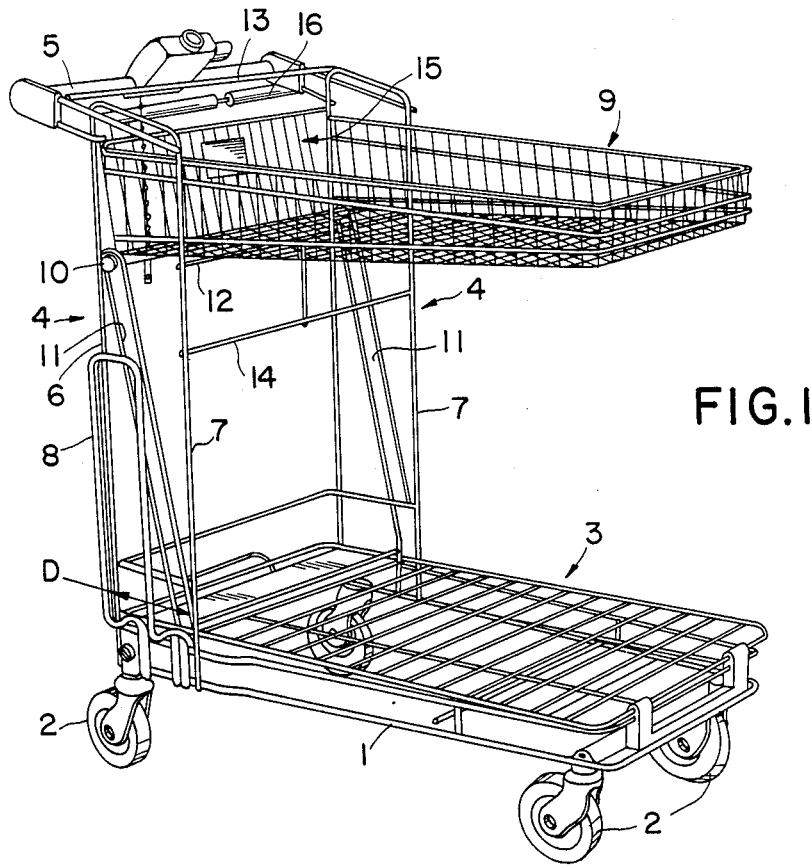
FIG. 1 is a view in perspective showing a trolley in accordance with the invention.
Figure 2:
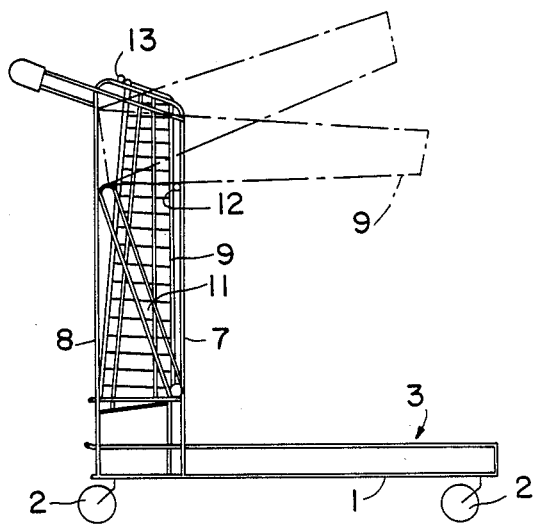
FIG. 2 is a schematic view in elevation illustrating the mode of pivotal displacement of the trolley basket.

The trolley illustrated in FIGS. 1 to 4 comprises a base frame 1 mounted on four casters 2. This base frame is adapted to support a carrier platform 3 for receiving relatively bulky merchandise and objects, said platform being advantageously constituted by a wire grid. In order to permit interengagement of several trolleys of this type in readiness for subsequent use, the base frame 1 is constituted by a band which is open at the rear and has a trapezoidal contour. With the same objective, the platform 3 is pivotally mounted on the base frame 1 at its front end whilst its rear end rests simply on supports provided on said frame. This permits lifting of the rear portion of this platform when two trolleys are engaged one inside the other.

At its rear end, the base frame 1 is adapted to carry a handle-bar frame formed by two uprights 4, the upper ends of which are connected together by means of a cross-member 5 which is intended to serve as an operating handle-bar. Each upright of the handle-bar frame is formed by two metal tubes or wires 6 and 7, the lower ends of which are fixed on the base frame 1. A support can be provided on at least one side of the handle-bar frame for placing articles of relatively substantial length on the trolley, such as planks, wood strips, curtain rods and the like. Said support can consist of a metallic hoop 8 which extends vertically opposite to one of the uprights of the handle-bar frame at a short distance from this latter.

The upper portion of the trolley in accordance with the invention is provided with a carrier basket 9 of small depth, the basket walls being advantageously constituted by wire grids. This basket is capable of pivoting about a horizontal axis defined by two projecting trunnions 10 carried by both bottom rear corners of the side walls of said carrier basket. Each trunnion is engaged within a guide 11 constituted by two parallel wires. These two guides are disposed in two vertical planes parallel to the longitudinal axis of the trolley. However, as is apparent from the drawings, said guides are inclined in such a manner as to ensure that their lower ends are located further forward than their upper ends over a distance D.

To this end, each guide 10 extends diagonally between the two metal tubes or wires 6 and 7 constituting the corresponding lateral upright 4 of the handle-bar frame, a sufficient interval being provided between these two tubes or wires. Thus the upper end of each guide is rigidly fixed to the rear member 6 whilst the lower end is rigidly fixed to the front member 7.

In its horizontal position of use, the carrier basket 9 rests on a horizontal cross-member 12 placed between the two front tubes 7 of the handle-bar frame uprights. This ensures perfect stability of the basket while enabling this latter to support relatively heavy objects. However, said basket can be brought into the vertical position of withdrawal shown in FIG. 4 by pivotal displacement about the horizontal axis constituted by the two trunnions 10, then by sliding displacement of said trunnions within the guides 11 down to the lower end of said guides. In order to perform this operation, the first step accordingly consists in lifting the basket to the vertical position as shown in full lines in FIG. 2. The second step consists in allowing the trunnions 10 to slide within the guides 11 to the lower ends of these latter.

However, it is worthy of note that, by virtue of the intended angle of slope of the guides, the above-mentioned downward movement produces a forward displacement of the corresponding corners of the trolley basket 9. In consequence, after having been brought to the vertical position of withdrawal, the trolley basket does not project to the rear with respect to the handle-bar frame or at least projects only to a very slight extent. On the other hand, if the guides had been vertical as is the case in currently available trolley baskets of the type considered, the greater part of said basket would in that case have projected to the rear of the handle-bar frame, thus correspondingly reducing the possibilities of interengagement of the different trolleys.

In order to obtain the desired result, the spacing of the two tubes or wires 6 and 7 constituting each upright of the handle-bar frame is such that the guides 11 placed diagonally between these members are sufficiently inclined to ensure that, in its vertical position of withdrawal, the pivoting basket 9 practically does not project to the rear of the trolley.

In this position of withdrawal, the trolley basket 9 is prevented from tilting backwards by a horizontal cross-member 13 provided at the upper end of the handle-bar frame. The basket is also prevented from tilting forwards by the cross-member 12 already mentioned and by another horizontal cross-member 14 provided beneath this latter.

Figure 3:
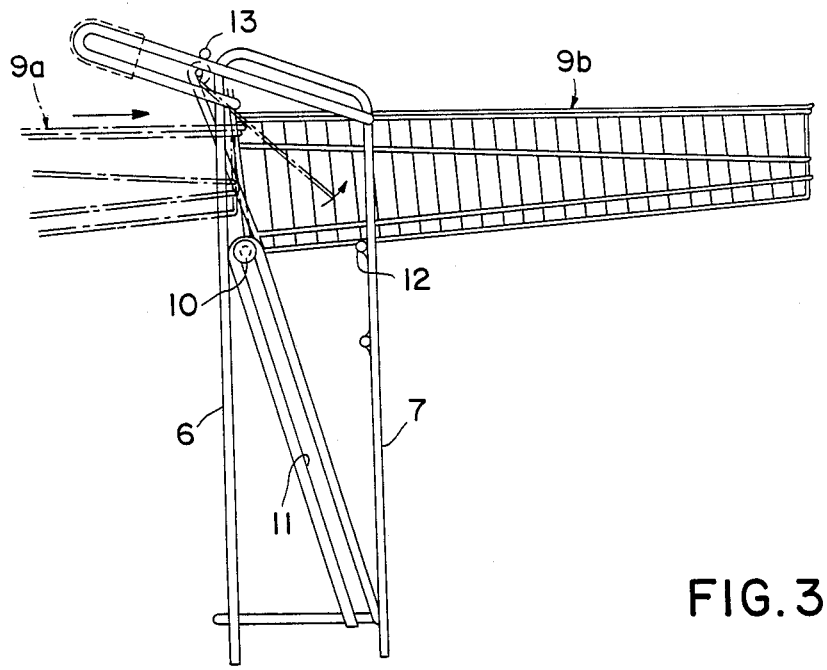
FIG. 3 is a partial view in elevation in which the pivoting basket is shown in the horizontal position of use, the front end of the basket of another trolley during engagement being shown in chain-dotted lines.

In accordance with another distinctive feature of the trolley under consideration, the trolley basket 9 is closed at the rear end by a movable flap 15 suspended from a horizontal rod 16 and freely mounted for pivotal motion about said rod. Moreover, said trolley basket has a shape which permits its engagement through the rear end of the similar basket of another identical trolley. Thus, as shown in FIG. 3, it is possible to interengage two trolleys in accordance with the invention when their top basket is placed in its horizontal position of use. In such a case, the front end of the basket 9a of the trolley located behind lifts the rear flap 15 of the basket 9b of the trolley located in front.

Figure 4:
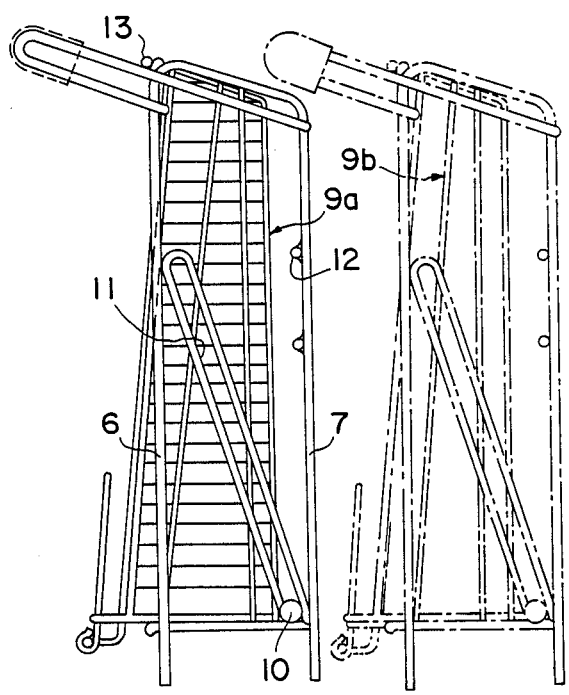
FIG. 4 is a partial view in elevation in which the pivoting basket is shown in the vertical position of withdrawal, the corresponding portion of an adjacent trolley being shown in chain-dotted lines.

However, as shown in FIG. 4, these trolleys can also be interengaged when their carrier basket 9a and 9b is placed in the vertical position of withdrawal. In contrast to trolleys of the type considered which are in current use, the trolleys in accordance with the invention can therefore be interengaged just as easily in one case as in the other on condition that, in all the trolleys of any one row, the carrier baskets are in the same position, that is, either in the horizontal position or in the vertical position. In accordance with this arrangement, it is only necessary to form two distinct lines or rows corresponding to each case.

However, FIG. 5 shows another embodiment which is specially designed to provide the possibility of engaging the trolleys in accordance with the invention, even if the carrier basket is in the horizontal position in some instances whereas the same basket is in the vertical position in other instances.

To this end, the carrier basket 9c of the corresponding trolleys has a length L which is shorter than in the previous case. This length is such that, in the vertical position of the basket, a free space E is allowed to remain above the basket so as to permit engagement of a similar basket 9d in the horizontal position on an identical trolley which is placed behind. This constitutes an extremely important advantage since both users and maintenance personnel are permitted to engage trolleys without any need to make sure that their carrier baskets are located in the same positions in each row.

Apart from this difference in length, the trolleys in accordance with FIG. 5 have the same structure as in the previous embodiment. In fact, the basket of each trolley is mounted so as to be capable of pivoting about a horizontal axis defined by two trunnions 10 carried by the bottom rear corners of the side walls of said basket. Moreover, said trunnions are engaged in guides 11 which, as in the previous embodiment, are inclined at an angle of slope which produces a forward displacement of the corresponding corners of each basket when this latter is brought to the vertical position of withdrawal.

It should be noted in addition that the reduction in capacity of the baskets which is due to a limitation in their length can be compensated by an increase in their depth. Accordingly, a wider spacing can be provided between the two wires or tubes 6 an 7 which constitute the lateral uprights of the handle-bar frame in order to set the guides 11 at a larger angle of slope.

FIG. 6 illustrates an alternative embodiment in which the lateral guides 11 provided in the preceding embodiment are replaced by guides 11e, the upper end of which has a forwardly directed elbowed portion 17. Moreover, the corresponding trolley basket 9e is adapted to carry a supplementary trunnion 10e in addition to the trunnion 10 located opposite to each bottom rear corner of its side walls. These additional trunnions are engaged in the elbowed portion of the guide 11e when said trolley basket is placed in its horizontal position of use. As and when the same trolley basket is swung back to its vertical position of withdrawal, the two trunnions 10 and 10e on each side are caused to slide within the guide 11e as shown in dashed outline in FIG. 6. The trunnions 10 and 10e prevent the basket from tilting forwards or backwards when it is located in its vertical position. These trunnions perform virtually the same function as the cross-members 13 and 14.

However, many other variants and modifications may clearly be contemplated for the shopping trolley in accordance with the invention. It is worthy of note that an incidental advantage arising from the particular arrangement of the guides 11 and 11e lies in the fact that the inclination of these latter produces a slight braking effect on the downward movement of the corresponding pivoting basket 9 or 9e, thus preventing any sudden drop of this latter when subjected to its movement of withdrawal. However, the main advantage of the trolleys in accordance with the invention evidently lies in the fact that the conditions of interengagement of these latter are highly improved both when their pivoting basket is in the vertical position of withdrawal and when said basket is in the horizontal position.

What is claimed is:

1. A shopping trolley having a frame provided at the top with a horizontal carrier basket pivotally mounted on said frame in such a manner as to permit withdrawal to a vertical positions at the rear end of said trolley by means of two lateral guides, trunnions which are carried by the sides of said pivoting basket and which define its horizontal axis of pivotal displacement being engaged within said guides, wherein:

in the first place, the two guides aforesaid which are disposed in two vertical planes parallel to the longitudinal axis of the trolley are inclined with their lower ends disposed further forward than their upper ends a distance such that in the vertical position of withdrawal, the pivoting basket is disposed between two lateral uprights of a handle-bar portion of said frame, in the second place, said pivoting basket is closed at the rear end by a flap which is freely mounted for pivotal displacement at its top edge and the shape of which permits engagement of the basket through the similar rear end of another identical trolley, thus permitting interengagement of trolleys both when their carrier baskets are placed in the horizontal position and when they are in the withdrawn position.

2. A shopping trolley according to claim 1, wherein the lateral uprights of the handle-bar frame portion are each constituted by two metal tubes or wires and the guides are disposed diagonally between said two tubes.

3. A shopping trolley according to claim 1, wherein the length of the pivoting basket is such that a free space is left above the basket in the vertical position of withdrawal so as to permit engagement of a similar basket of an identical trolley while said basket is in the horizontal position, thereby permitting interengagement of said trolleys.

* * * * *